United States Patent [19]

Wortman

[11] 4,004,212
[45] Jan. 18, 1977

[54] MINE DETECTOR SYSTEM

[75] Inventor: Donald E. Wortman, Rockville, Md.

[73] Assignee: The United States of America as represented by the Secretary of the Army, Washington, D.C.

[22] Filed: Dec. 20, 1972

[21] Appl. No.: 316,598

[52] U.S. Cl. .................................. 324/3; 250/312; 250/366

[51] Int. Cl.² .......................................... G01V 3/00

[58] Field of Search ............ 324/3, 41, 77 G, .5 R; 250/255, 303, 312, 366, 391, 390

[56] References Cited

UNITED STATES PATENTS

| | | | |
|---|---|---|---|
| 2,679,013 | 5/1954 | Barnes | 324/77 G |
| 2,912,641 | 11/1959 | Ruble | 324/.5 R |
| 2,929,984 | 3/1960 | Puranen et al. | 324/3 |
| 3,008,047 | 11/1961 | Earley et al. | 250/255 |
| 3,015,061 | 12/1961 | Bocke | 324/41 |
| 3,146,349 | 8/1964 | Jordan | 250/391 |
| 3,308,296 | 3/1967 | Cowan et al. | 250/366 |
| 3,315,076 | 4/1967 | Jordan | 250/303 |
| 3,471,772 | 10/1969 | Smith | 324/3 |
| 3,519,925 | 7/1970 | Anstey et al. | 324/77 G |
| 3,521,044 | 7/1970 | Costas | 324/77 G |
| 3,832,545 | 8/1974 | Bartko | 250/312 |

FOREIGN PATENTS OR APPLICATIONS 917,557 2/1963 United Kingdom .................. 324/3

Primary Examiner—Malcolm F. Hubler
Assistant Examiner—S. C. Buczinski
Attorney, Agent, or Firm—Nathan Edelberg; Robert P. Gibson; Saul Elbaum

[57] ABSTRACT

A mine detector system that utilizes an explosive comparator to increase the sensitivity and selectivity. The system utilizes a generator to transmit a signal simultaneously toward the area to be scanned for mines and towards a sample of the explosive sought. Detectors are positioned within the device to receive the reflected signals from both the area to be scanned and the sample explosive. The outputs from both detectors are fed to preferably a null type comparator for correlation. When the two signals correlate, mine presence is indicated.

2 Claims, 2 Drawing Figures

MINE DETECTOR SYSTEM

RIGHTS OF GOVERNMENT

The invention described herein may be manufactured, used, and licensed by or for the United States Government for governmental purposes without the payment to me of any royalty thereon.

BACKGROUND OF THE INVENTION

1. Field of the Invention

This invention relates to mine detectors and, more particularly, to a mine detection system that utilizes explosive comparators.

2. Description of the Prior Art

Representative of the present state of the art in mine detectors would be a device which sweeps over the area to be scanned transmitting a particular signal into the ground and awaiting for a change in signal.

If such a device passes over tree roots, coke bottles, and other similar irrelevant debris, a change in signal may be sensed; however, the mine obviously has not been properly located. Moreover, the change in signals are usually quite small which results in an extremely low detection efficiency. It is worth noting that with respect to the present state of the art mine detectors, they all fail to utilize an available piece of information which relates to the type of mine and its explosive being sought.

It is therefore the primary object of the present invention to provide a mine detection system which makes use of the information available about the type of explosive being sought.

Another object of the present invention is to provide a mine detection system that compares a signal reflected from the scanned area with a signal from a sample to provide a more sensitive and accurate indication of object presence.

SUMMARY OF THE INVENTION

Briefly, in accordance with the invention, a mine detection system is provided which comprises a sample of the explosive sought, means for transmitting a signal to reflect simultaneously from the sample and from the area to be scanned, a pair of detectors to detect the pair of signals reflected from the sample and the area to be scanned, respectively, and means for comparing the signals thus detected and for giving an output indication upon their successful correlation. Electronic means can also be provided to eliminate height variations and to compensate for the attenuation of any transmitted signal by the ground or other intermediary. Similar physical problems can be similarly compensated by proper electronics.

BRIEF DESCRIPTION OF THE DRAWINGS

The specific nature of the invention as well as other objects, aspects, uses, and advantages thereof will clearly appear from the following description and from the accompanying drawing, in which.

DESCRIPTION OF THE PREFERRED EMBODIMENT

Figure 1:
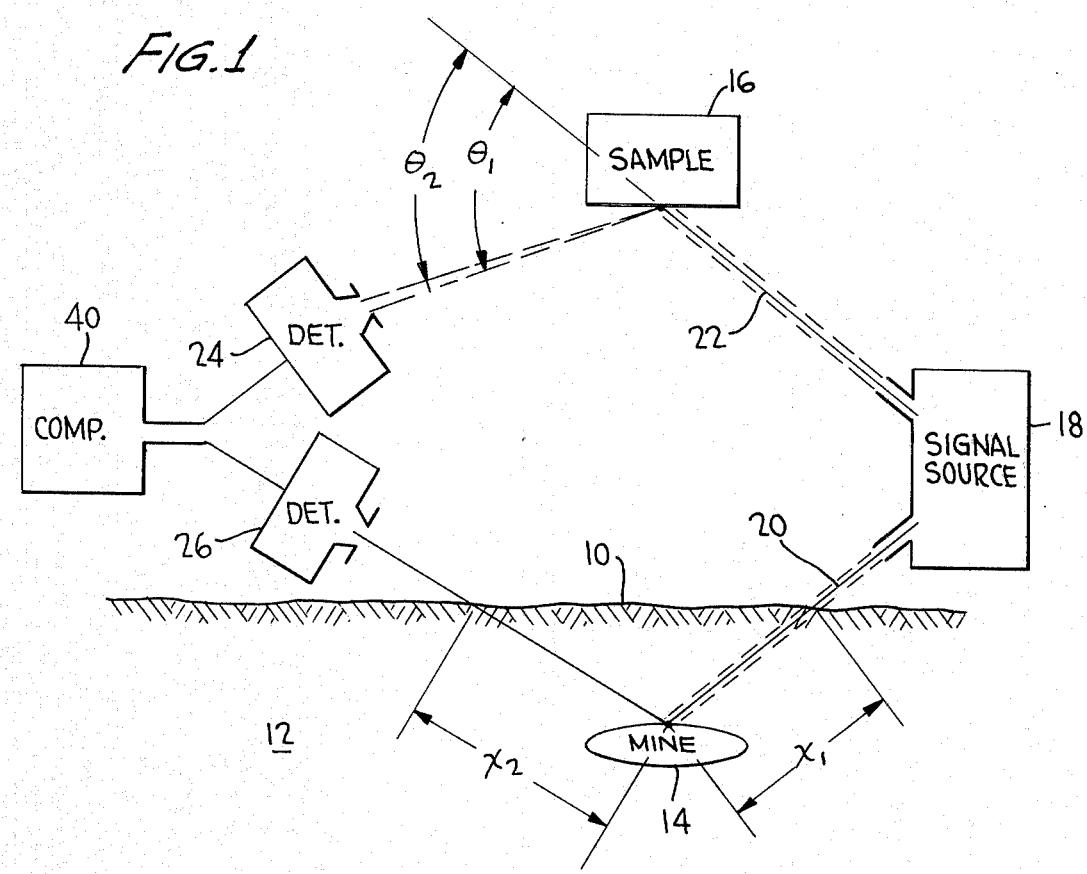
FIG. 1 is a diagrammatic sketch illustrating the basic components of a preferred embodiment of the present invention.

The central idea to the present invention is simply to make use of a sample of the explosive being sought as part of the detection system in a mine detector. If the type of explosive that is being sought is known beforehand, a very valuable piece of information is available and is made use of by means of the present invention. A simplified version of the instant invention is depicted in FIG. 1 of the drawing in which 18 represents the signal source, 14 represents a mine that contains an explosive charge of a type known, 16 contains a sample of the same known explosive, 24 and 26 represent detectors for detecting those signals reflected from sample 16 and mine 14, and 40 represents a comparator, preferably of a null type, for comparing the detected signals from detectors 24 and 26 until correlation is found. It is easily understood and seen that use of sample 16 in searching for the explosive in mine 14 is one more bit of information than heretofore available in mine detection schemes. Mine 14 is depicted as being below the surface 10 of the earth 12 whereby signal 20 from signal source 18 must traverse a distance through earth 12 equal to $x_1$ plus $x_2$ as shown in FIG. 1. The signal thus generated and reflected will in some measure be attenuated by having to pass through the earth. However, the electronic circuitry in comparator 40 can compensate for this attenuation since it generally varies according to well known equations.

Figure 2:
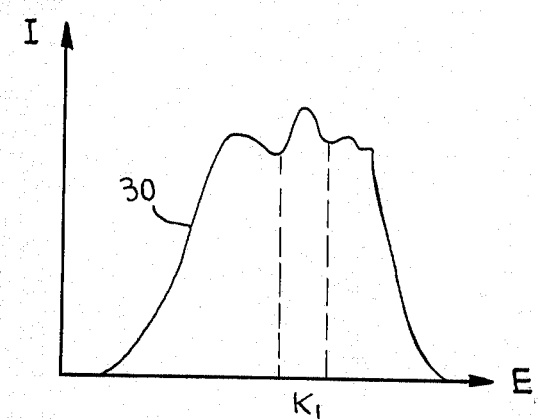
FIG. 2 is a graphical representation which will be helpful in understanding the principles of operation of a preferred embodiment of the instant invention.

As specific examples for use in the system of FIG. 1, signal source 18 may be a gamma ray source that directs two beams of gamma rays 20 and 22 toward the area to be scanned and the sample 16, respectively. If the explosive being sought is assumed by way of example to be TNT, detector 24 is positioned to sense scattering of gamma rays from the sample of TNT 16. The spectral distribution of gamma rays observed by detector 24 will be those characteristic of the scattering between angles $\theta_1$ and $\theta_2$ from the collimated gamma rays beamed onto sample 16. The spectral distribution will be similar to the sum of gamma rays scattered between $\theta_1$ and $\theta_2$ from carbon, hydrogen, nitrogen and oxygen in the case of TNT. This spectral distribution is schematically represented in FIG. 2 which shows the gamma ray intensity measured by detector 24 as a function of the energy of the gamma rays wherein $K_1$ is a characteristic peak at the particular angle of scattering from TNT. If gamma rays 20 are also beamed into the ground 12, detector 26 will sense the scattering as shown in FIG. 1. When no mine is present in the ground 12, a characteristic pattern of gamma scattering will be observed, but there will be no matching in comparator 40 of characteristic peak $K_1$ with any characteristic peak in the earth back scattering distribution. However, in the cases where a TNT mine 14 is present in ground 12, the signal at detector 26 will have the intensity $I_{d2}$:

$$I_{d2} = I_{d1}\, e^{-ux}$$

where $I_{d1}$ is the intensity of the signal at detector 24. The attenuation factor is seen to be $e^{-ux}$, wherein $x$ is equal to the total path length in earth traveled by the gamma ray beam ($x = x_1 + x_2$) and $u$ is the attenuation coefficient of earth which comprises $\sigma$scattering + $\sigma$absorption.

Comparator 40 may comprise a balanced bridge circuit such that a null is attained when the two signals from detector 24 and detector 26 are nearly equal indicating the presence of the explosive. Alternatively, the scattering of the gamma rays attributable to the earth can be subtracted from the signal at detector 24 at all times. When there is no mine present, a null will be observed; whereas when a mine is present, the balance changes. The advantages of null detection for weak signals is well known and need not be dealt with extensively here. In practical devices, both detectors preferably sense nearly 180° back scattered gamma rays. This serves to eliminate the sensitivity of the instrument to height variations and allows the electronics in the comparator to vary the signal as $e^{-ux}$ to allow for searching of mines at different depths. Other height problems due to physical characteristics such as the problem of the instrument bouncing along the ground can be fixed by other sensors which note the height variations and attenuate the signal from detector 24 accordingly.

It is thus seen that by using the piece of knowledge of the known constituent of the explosive in the mine, a more efficient, accurate and reliable detection scheme can be realized. This would eliminate the vagaries present in prior art devices which merely observe a change in signal, rather than the more sophisticated technique of null detection. I wish it to be understood that I do not desire to be limited to the exact details of constructions shown and described for obvious modifications will occur to persons skilled in the art.

I claim as my invention:

1. Apparatus for detecting the presence of an explosive whose constituents are known which comprises:
   a. a sample of said explosive's constituents;
   b. a dual port single gamma ray source for simultaneously transmitting a gamma ray signal towards said sample and towards the area to be scanned;
   c. first means for detecting the reflected radiation signals from said area under observation;
   d. second means for detecting the reflected signals from said explosive sample; and
   e. means for comparing the signals detected from said first and second detecting means and for giving an output indication upon the correlation of said signals.

2. The apparatus according to claim 1 wherein said comparing means further comprises means for adjusting the signal strength scattered from said sample in order to compensate for the attenuation of the signal in said area to be scanned.

* * * * *